United States Patent [19]

Fogle

[11] Patent Number: 5,463,815
[45] Date of Patent: Nov. 7, 1995

[54] RIBBED FLEXIBLE CUTTING LINE

[75] Inventor: John R. Fogle, Scottsdale, Ariz.

[73] Assignee: Robert L. Phillips, Scottsdale, Ariz.; a part interest

[21] Appl. No.: 304,155

[22] Filed: Sep. 12, 1994

[51] Int. Cl.$^6$ ................................................. B26B 27/00
[52] U.S. Cl. ........................... 30/276; 56/295; 428/397
[58] Field of Search ....................... 30/276, 347; 56/295, 56/12.7; 428/397, 398, 399, 400, 401

[56] References Cited

U.S. PATENT DOCUMENTS

| | | |
|---|---|---|
| 4,047,299 | 9/1977 | Bair ............................................ 30/276 |
| 4,054,993 | 10/1977 | Kamp et al. ................................ 30/276 |
| 4,118,865 | 10/1978 | Jacyno ....................................... 30/276 |
| 4,177,561 | 12/1979 | Ballas ........................................ 30/276 |
| 4,186,239 | 1/1978 | Mize .......................................... 30/276 |
| 4,869,055 | 9/1989 | Mickelson ................................. 56/12.7 |
| 4,905,465 | 3/1990 | Jones et al. ................................ 56/295 |
| 5,048,278 | 9/1991 | Jones et al. ................................ 56/295 |
| 5,220,774 | 6/1993 | Harbeke et al. ........................... 56/12.7 |

Primary Examiner—Hwei S. Payer
Attorney, Agent, or Firm—LaValle D. Ptak

[57] ABSTRACT

A line for a rotating trimmer has a plurality of longitudinal outwardly-extending cutting edges, spaced circumferentially about the main body portion of the line. A cross-sectional area of the main body portion is selected to be between 70 percent and 90 percent of the area of the space circumscribing the cutting edges to provide substantial bulk to the line to increase its wear, while retaining the advantages of the cutting edges for facilitating cutting of grass and the like.

17 Claims, 2 Drawing Sheets

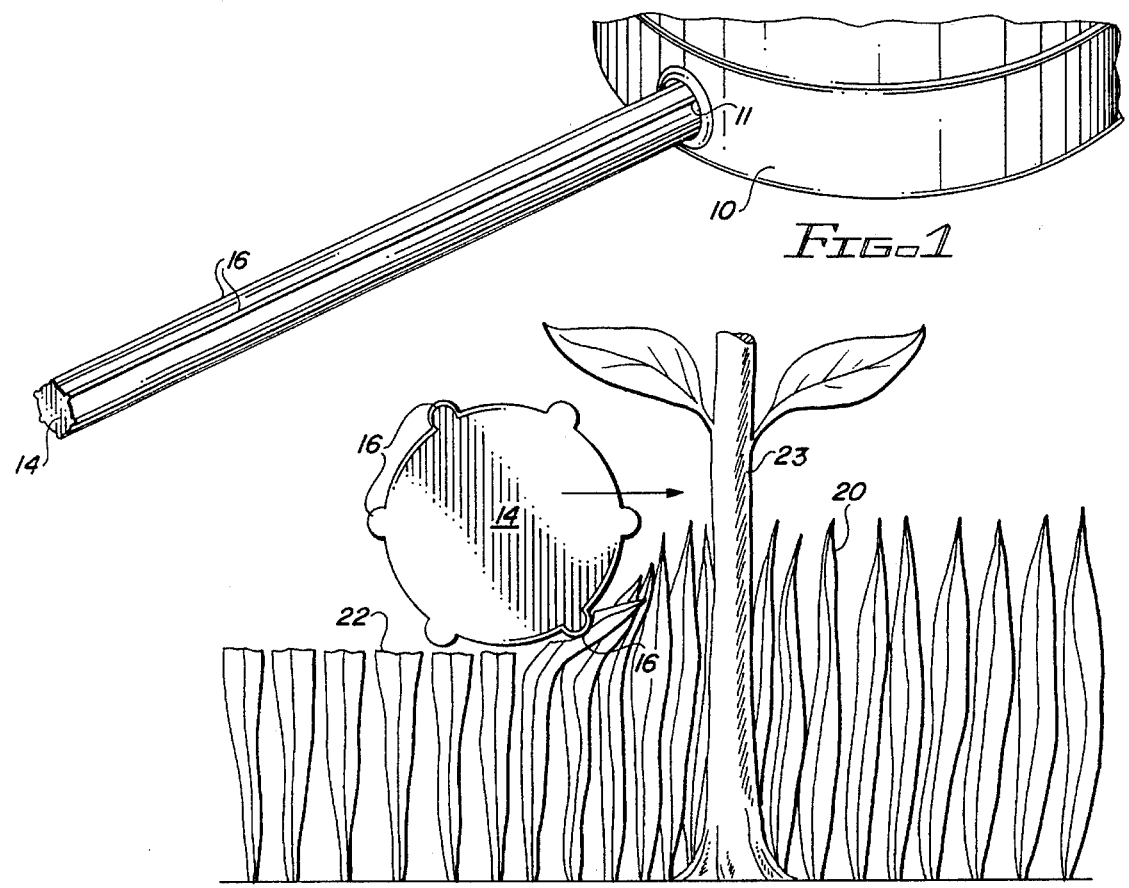
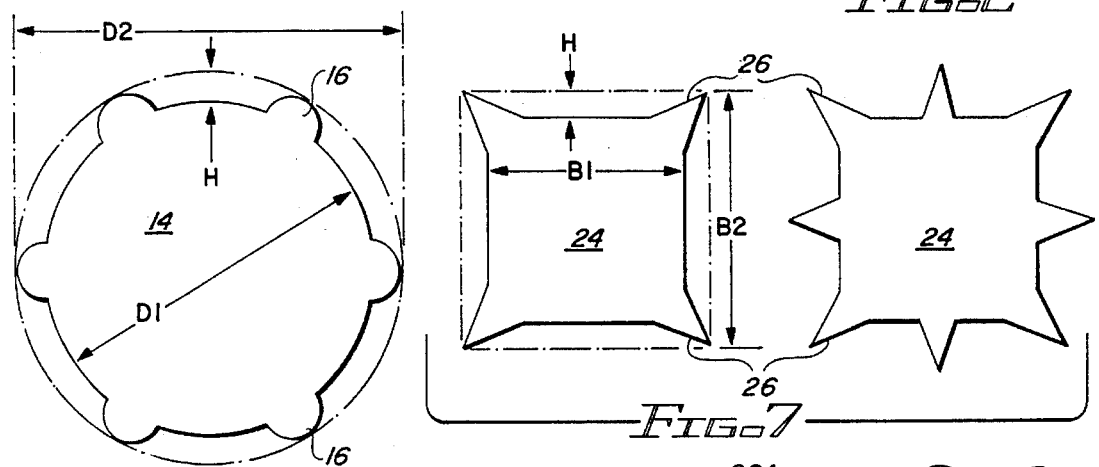
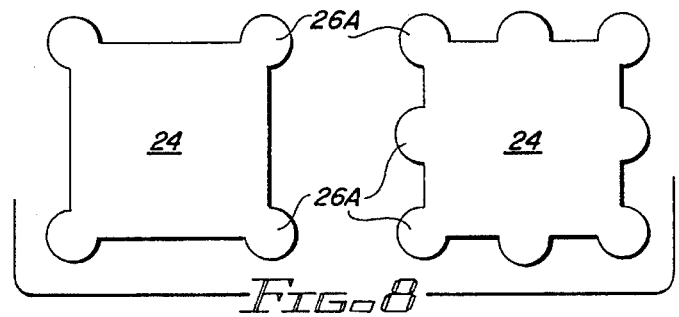

RIBBED FLEXIBLE CUTTING LINE

BACKGROUND

Weed and grass trimmers have been developed which employ a rotatable hub with a short length of flexible nylon or other plastic line extending from the hub. When the hub is rotated, the tip of the line extending from the hub provides the cutting or trimming action. Grass and weed trimmers using this principle of operation have become popular for their versatility of use and because the flexible trim line is safer to use than rigid, rotating steel blades.

Various types of devices have been developed for using such trim lines. Typically, rotating line trimmers or string trimmers employ a line which generally has a circular cross section. The line, in many trimmers, is wound on a storage reel in the hub of the device, and is played out of a hole in the hub in discrete amounts as the end breaks off or wears off. In operation, the section of the line which extends outwardly from the rotating head attains a substantially straight configuration as a result of the centrifugal force. As the line is swung in a circle by the rotating head, it cuts grass, vines, brush and the like, with which it comes into contact.

The circular cross-sectional configuration of trimmer lines generally leaves a ragged edge on the ends of the blades of grass or plants cut with such trimmers. This is a result of the relatively blunt cutting edge, which strikes the grass and breaks it off. As a result, the ragged grass tends to turn brown shortly after cutting, resulting in a less desirable appearance than if the grass is cut or broken off cleanly along a straight line.

The U.S. patent to Mize U.S. Pat. No. 4,186,239 discloses a modification of the normal cross section monofilament line used in weed and grass trimmers. In the Mize device, periodic irregular cross-sectional variations are formed along the length of the line for the purpose of reducing fibrillation of the filament. This patent also discloses line extrusions of generally triangular or star shapes, in which the cutting edges are provided with notches or irregularities in planes perpendicular to the central axis of the cutting line. In all of the variations which are shown in this patent, however, a relatively large blunt edge contacts the plant to effect the cutting.

Several U.S. patents are directed to rotary line cutters, in which the cutting lines have triangular cross sections. Three such patents are Jacyno U.S. Pat. No. 4,118,865; Jones et al. U.S. Pat. No. 4,905,465; and Jones et al. U.S. Pat. No. 5,048,278. The lines of all of these patents are of a relatively short finite length. They are not extended from a supply reel as they wear out. Theoretically, however, the triangular cross sections are intended to present a sharp cutting edge to the grass or the plants to be cut. In actual practice, however, if the orientation of the triangle causes one of the flat triangle surfaces to be presented to the plant in the plane of impact, a flat, blunt surface effects the cut, instead of one of the sharp triangular edges.

A different modification of the conventional circular cross-sectional trimmer line is disclosed in the United States patent to Mickelson U.S. Pat. No. 4,869,055. The line disclosed in this patent has a generally star-like cross-sectional configuration, in which longitudinally extending sharp edges are separated by depressed areas (concave or sharp angular configurations) between any two adjacent edges. The depressed areas are significant (at least 10 percent of the length of a straight line from the tips of adjacent edges); so that the sharp edges always are at the outermost portion of the line. The intent of the line disclosed in this patent is that, irrespective of the orientation of the line, a sharp edge always strikes the plant or weed first. The line is symmetrical in its cross section; and as it rotates, sharp edges, by design, always strike the plant first. Since the tips of the sharp edges define the external diameter of the line which must be fed through the opening in the head of the trimmer, the depressed areas cause the line to have considerably less mass than a corresponding standard, circular, cross-sectional line of the same nominal diameter. In fact, the mass of a line manufactured in accordance with the disclosure of the Mickelson '055 patent has only approximately two thirds of the mass of a standard, circular cross-sectional line. Because the sharp edges of the Mickelson line always strike the plant first, these edges quickly wear away; and the reduced mass of the line also causes this line rapidly to wear out. In addition, the reduced amount of material causes a reduction in the mass, and therefore the force at which the line strikes vegetation, causing the line to be of significantly reduced efficiency when plants other than grass are encountered by the line.

Another patent which discloses a line with a somewhat star-shaped cross section is the U.S. patent to Bair U.S. Pat. No. 4,047,299. The cutting line described in this patent is indicated as having a star-shaped cross section. The line is described as being "non circular or non-round" with longitudinal ribs to form this cross-sectional configuration. The Bair patent, however, is silent as to the relative dimensions of the ribs and the rest of the line, and merely states that the longitudinal ribs are included to provide additional stiffness and strength, facilitating the cutting of heavier vegetation.

The diameter of lines used for string trimmers typically is in a range of 0.040 inches to 0.155 inches. The larger diameters typically are used for commercial trimmers designed for trimming relatively heavy vegetation. The larger cross-sectional sizes of the cutting lines require greater power to operate the trimmer. Consequently, non-commercial trimmers typically use lines of the smaller diameters (for example, 0.040 inches) with a smaller, lighter weight motor.

It is desirable to provide a line for rotating string trimmers which overcomes the disadvantages of the prior art devices mentioned above, and which provides relatively clean, sharp cuts in grass and also is capable of use in heavy vegetation without excessive wear.

SUMMARY OF THE INVENTION

It is an object of this invention to provide an improved flexible cutting line for rotary grass and weed trimmers.

It is another object of this invention to provide an improved flexible cutting line having sharp edges extending longitudinally of the line for making cleaner cuts.

It is an additional object of this invention to provide an improved flexible cutting line for rotating string trimmers which provides improved cutting characteristics.

It is a further object of this invention to provide an improved flexible cutting line for rotary string trimmers, which includes longitudinal outwardly-extending cutting edges on the main body portion of the line where the maximum tip-to-tip dimension of the line, relative to the maximum dimension of the main body portion, is selected to cause the mass of the line to be between 70 percent and 90 percent of the mass of a conventional circular cross section of a line having a diameter equal to the tip-to-tip dimension.

In accordance with a preferred embodiment of this invention, a line for a rotating string trimmer comprises an elongated flexible cutting element. The cutting element has a main body portion with a central axis and at least three spaced apart, longitudinal, outwardly-extending cutting edges on the main body portion. The amount of the tip extension of the cutting edges is selected to cause the cross-sectional area of the main body portion to be between 70 percent and 90 percent of the area of a space circumscribing the cutting edges.

BRIEF DESCRIPTION OF THE DRAWINGS

FIG. 1 is a perspective view of a preferred embodiment of the invention;

FIG. 2 is an enlarged end view illustrating the manner of operation of the embodiment shown in FIG. 1;

FIG. 3 is an enlarged end view of the embodiment shown in FIGS. 1 and 2, providing relative dimensions of the various parts of the embodiment;

FIG. 7 illustrates alternative configurations of another preferred embodiment of the invention;

FIG. 8 illustrates other alternative configurations of such other preferred embodiment of the invention.

DETAILED DESCRIPTION

Reference now should be made to the drawings, in which the same reference numbers are used throughout the different figures to designate the same components. In FIG. 1, a portion of the central rotating hub 10 of a conventional rotatable weed and grass trimmer is illustrated. The mechanism for rotating the hub 10 may be any well known mechanism; and for that reason, it has not been illustrated in FIG. 1.

The hub 10 of a conventional rotating hub weed trimmer generally has a spool located in it, around which a length of flexible strength trimmer line 14 or monofilament trimmer line is wound. The free end of the trimmer line 14 extends through a circular opening 11 in the hub 10. The opening 11 has an internal diameter sufficiently large to permit the line 14 to pass freely through the outside rim or edge of the hub 10 to extend to a length which typically is from three to seven inches from the hub itself.

As is well known, when the hub 10 is rotated, the end of the trimmer line 14 effects the cutting or trimming operation. As a trimmer fine 14 wears out, additional line is played out from the storage reel or spool (not shown) inside the hub 10 to continue replenishing the line 14 as it is used. Various mechanisms are used for automatically or semi-automatically providing such a playout of the line 14. Once again, these mechanisms are not important to an understanding of the present invention; and for that reason, they have not been illustrated, and are not described here.

The hub 10 rotates at high speeds, typically in the range of from 2,000 to 20,000 RPM; so that a substantial force is presented to the line 14, which extends out of the hub 10. The mass of the line, coupled with its velocity, determines the force applied by the rotating line to the grass or other vegetation which is to be cut. The high rotating speed permits the line 14 effectively to sever vegetation struck by the line 14 by means of abrasion of the stalk of the vegetation through impact and a slicing type of action.

Figure 9:
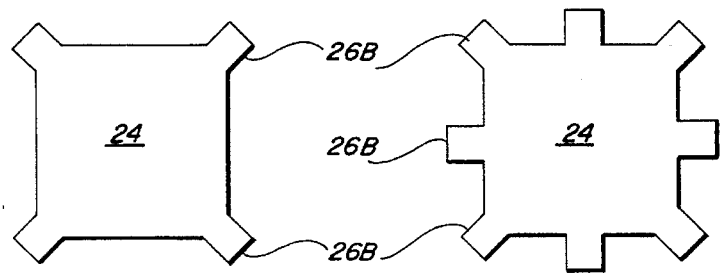
FIG. 9 illustrates additional configurations of such other preferred embodiment of the invention.

As illustrated in FIGS. 1, 2, 3 and 5, the line 14, which is shown in FIG. 1, has a uniform cross section throughout its length. The line 14 typically is made of an extruded length of monofilament material, such as extruded monofilament nylon. The line 14 has a main body portion, which in the embodiment shown in FIGS. 1, 2, 3 and 5, is of a generally cross-sectional circular configuration. As illustrated in FIGS. 7, 8 and 9, however, other cross-sectional configurations, such as the square cross-sectional configuration of the main body portion 24 shown in these figures, also may be used. The cross-sectional configuration of the main body portion does not necessarily need to be circular. It has been found, however, that a generally circular configuration, such as shown in FIG. 3, is highly suitable for the purposes of the invention.

The line shown in FIGS. 1, 2 and 3 has a circular main body portion 14 and six longitudinal, outwardly-extending cutting edges 16 equally circumferentially spaced about the periphery of the main body portion 14. In the embodiment shown in FIGS. 1, 2 and 3, these longitudinal cutting edges 16 have a generally semi-circular configuration with the radius of the cutting edges or ribs being substantially less than the radius of the main body portion 14.

It should be noted that FIG. 2 is a greatly enlarged view of the cutting line 14. Actual dimensions of cutting lines range from 0.040 inches to 0.175 inches. For a trimmer hub 10 designed with a circular opening 11 to accommodate any given line of the typical sizes used for that particular rotating hub 10, these dimensions necessarily constitute the dimension $D_2$ shown in FIG. 3, designating the diameter of the dotted line circle which circumscribes the tips of the cutting edges 16 on the main body portion 14. The diameter of the main body portion 14, as shown in FIG. 3, is $D_1$; and the height (H) or outward radial extension of the cutting edges 16, constitutes the difference between these two diameters; so that $H=(D_2 - D_1)/2$.

From an examination Of FIG. 2, it is apparent that whenever the line 14 is used to cut grass 20, the blade of grass typically first is struck with a leading one of the cutting edges 16 to sever the grass to a height 22. By maintaining most of the mass of the line, however, in the main body portion 14, whenever the line strikes a larger plant or weed 23, sufficient bulk or mass is present to provide a clean breaking or severing of the plant 23 without excessive wear of the line 14. For a plant such as the plant 23 having a heavier stem than the grass 20, the primary breaking or cutting of the stem of the plant 23 is effected by means of the bulk of the main body portion 14 of the line.

Figure 5:
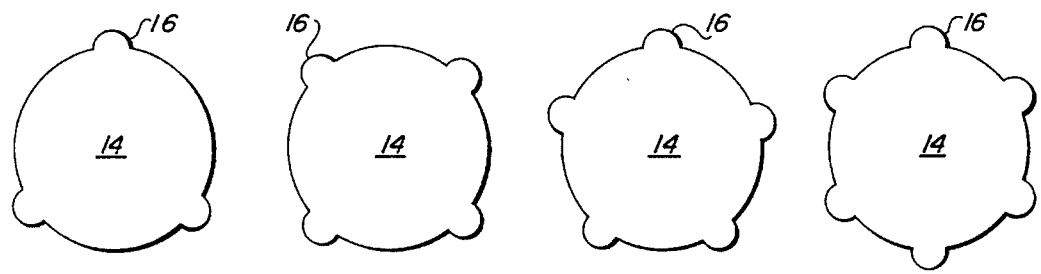
FIG. 5 illustrates other alternative configurations of a preferred embodiment of the invention.

FIG. 5 illustrates other configurations of a cutting line of the type shown in FIGS. 1, 2 and 3 employing different numbers of longitudinal, outwardly-extending, semi-circular edges 16 on them. As described above, the line of FIGS. 1, 2 and 3 has six equally circumferentially spaced cutting edges 16 on it. FIG. 5, however, illustrates similar cross sections of a cutting line 14 employing three, four and five equally circumferentially spaced cutting edges 16. These lines may be employed in place of the six edge line illustrated in detail in FIGS. 1, 2 and 3. The dimensional characteristics of these other variations shown in FIG. 5, however, are the same as those illustrated in FIG. 3.

Figure 4:
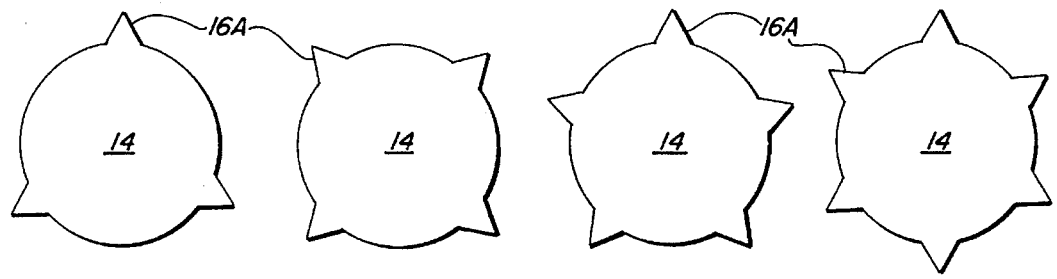
FIG. 4 illustrates alternative configurations of a preferred embodiment of the invention.
Figure 6:
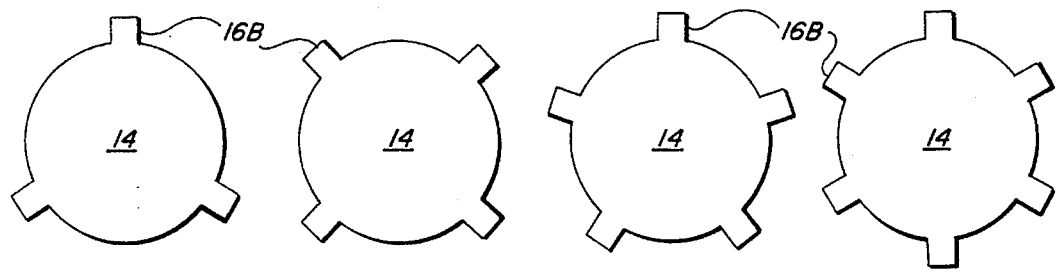
FIG. 6 illustrates additional alternative configurations of a preferred embodiment of the invention.

FIGS. 4 and 6 illustrate still other cross-sectional configurations which may be employed in place of the one shown in FIGS. 1, 2, 3 and 5. The main body portion of the line 14 is the same in these figures; but the longitudinal, outwardly-extending cutting edges 16A in FIG. 4 have a triangular cross-sectional configuration with a sharp tip at the ends. In the variation shown in FIG. 6, the cutting edges are of a rectangular or square cross-sectional configuration 16B. In all other respects, the lines shown in FIGS. 4 and 6, however, function in the same manner described above for the line shown in FIGS. 1, 2, 3 and 5; and the dimensions shown in FIG. 3 are applicable to the lines of FIGS. 4 and 6.

FIGS. 7, 8 and 9 are directed to yet another embodiment of a line which may be employed. In the lines shown in these figures, the cross-sectional configuration of the main body portion is a square main body portion 24; and triangular, circular or square longitudinal, outwardly-extending cutting edges 26, 26A and 26B, respectively, are used on the four longitudinal corners of the main body portion 24 and in the second variation of each of these three figures in intermediate positions on each of the faces of the basic square cross-sectional configuration of the main body portion 24.

In FIG. 7, the transverse dimension of the square 24 is shown as $B_1$ where the maximum transverse dimension from tip-to-tip of the cutting edges is shown as $B_2$, with the height of the cutting edges being defined as one-half of the difference between one of the sides of the square 24 and a circumscribing square drawn between adjacent tips 26, 26A or 26B of the cutting edges 26, 26A or 26B.

In all of the variations shown in FIGS. 4 to 9, the tips are made quite small relative to the size of the main body portion. For the triangular tips of FIGS. 4 and 7, and the tips of FIGS. 6 and 9, the ratio of the base width to height is 1:1 or 2:1, preferably.

The cutting edges, in the form of longitudinal, outwardly-extending projections 16, 16A, 16B or 26, 26A, 26B, have been found to reduce air drag on the line 14 or 24, which results in improved cutting as indicated by lower engine strain when the outermost tips of the cutting edges 16, 16A, 16B, 26, 26A or 26B penetrate heavy grasses. It also has been observed that while the trimmer head rotated while not engaging grass, rotational speed (RPM) appeared to be higher than when conventional round line was used, thereby reflecting reduced air drag. Similarly, the outermost tips of the cutting edges 16, 16A, 16B, 26, 26A, or 26B penetrate grass or brush to produce improved trimming. Since trim lines of the type shown and described above typically are used to trim brush, weeds and other vegetation as well as grass, it is desirable to have as much mass in the line 14 or 24 as possible, while still providing relatively sharp cutting edges to provide clean trimming of grass. By maintaining a relatively large mass (as compared to a standard circular cross section line), reduced wear is obtained; and the cutting ability is also maintained as a result of the higher momentum present in contrast with low mass lines.

Reference once again should be made to FIG. 3. It has been found that production of a line having cross-sectional configurations as illustrated in any of FIGS. 4 through 9, provides sharp cutting edges for grass while maintaining the heavy vegetation and weed cutting capabilities by maintaining between 70 percent and 90 percent of the mass of a conventional circular line having a diameter $D_2$ illustrated in dotted lines in FIG. 3. To do this, the height (H) of the tips 16 (or 16, 16B, 26, 26A and 26B) must be selected to provide sufficient diameter $D_1$ to the main body portion 14 (or $B_1$ for the main body portion 24) for the line. Since the opening 11 in the rotating hub 10 determines the diameter $D_2$, which may be used with any given trimmer, this diameter circumscribing the tips of the cutting edges 16, constitutes the maximum outside diameter for any given line used with a particular trimmer hub 10. Consequently, $D_2$ is to be considered to be the normal line diameter for the trimmer with which this invention is to be used. To maintain the mass or bulk of the line 14 at between 70 percent and 90 percent of the equivalent conventional circular line with a diameter $D_2$, the area of the main body portion $D_1$ with respect to the area of the main body portion $D_2$ needs to be considered. This area is directly proportional to the mass of the line. Thus, the area ($A_1$) of the main body portion 14 having a diameter $D_1$ is $A_1=\pi D_1^2/4$; and the area ($A_2$) of the hypothetical standard having a diameter $D_2$ is $A_2=\pi D_2^2/4$. The ratio of these areas $A_1/A_2=D_1^2/D_2^2$. Thus $D_1=D_2\sqrt{A_1/A_2}$. For the purposes of calculating the relative mass (area) of these two different circular configurations, the mass of the longitudinal cutting edges 16 is ignored, since it is not particularly significant. It should be noted, however, that in the ensuing calculations, the mass contributed by the longitudinal cutting edges 16 increases slightly the overall mass of the cutting line above the percentages given in the following table.

It also has been determined that the tip height (H) should be no less than 0.001 inches on the smallest line (typically 0.040 inches) and no greater than 0.015 inches on a larger line (for example, 0.155 inch diameter). As mentioned above, the desired ratio of the area of the circle with the diameter $D_1$ to the area of the circle with the diameter $D_2$ has been determined to be between 70 percent and 90 percent, and preferably, in the range of 80 percent to 90 percent. This range provides a sufficient tip height (H) to provide the desirable operating characteristics described above.

The actual dimensions of lines for the embodiments of FIGS. 1 through 6, capable of being substituted for corresponding conventional trimmer lines having a circular cross section in the range from 0.040 inches to 0.155 inches, are given below in Table 1.

TABLE 1

| $D_2$ | $A_1/A_2$ | $D_1$ | $(D_2 - D_1)/2 = H$ |
|---|---|---|---|
| .040 | .70 | .0334 | .0033 |
|  | .75 | .0346 | .0027 |
|  | .80 | .0358 | .0021 |
|  | .90 | .0379 | .0011 |
|  | .70 | .0418 | .0041 |
|  | .75 | .0433 | .0034 |
| .050 | .80 | .0447 | .0021 |
|  | .90 | .0474 | .0013 |
|  | .70 | .0544 | .0053 |
| .065 | .75 | .0563 | .0044 |
|  | .80 | .0581 | .0035 |
|  | .90 | .0617 | .0017 |
|  | .70 | .0669 | .0066 |
| .080 | .75 | .0693 | .0054 |
|  | .80 | .0716 | .0042 |
|  | .90 | .0759 | .0021 |
|  | .70 | .0795 | .0078 |
| .095 | .75 | .0823 | .0064 |
|  | .80 | .0850 | .0050 |
|  | .90 | .0901 | .0025 |
| .105 | .70 | .0878 | .0086 |
|  | .75 | .0909 | .0071 |
|  | .80 | .0939 | .0056 |
|  | .90 | .0996 | .0027 |
|  | .70 | .1088 | .0106 |
| .130 | .75 | .1126 | .0087 |
|  | .80 | .1163 | .0069 |
|  | .90 | .1233 | .0034 |

TABLE 1-continued

| $D_2$ | $A_1/A_2$ | $D_1$ | $(D_2 - D_1)/2 = H$ |
|---|---|---|---|
|  | .70 | .1297 | .0127 |
| .155 | .75 | .1342 | .0104 |
|  | .80 | .1386 | .0082 |
|  | .90 | .1470 | .0040 |

The chart of Table 1 provides the dimensions which are necessary to produce the mass of the line in the desired range from 70 percent to 90 percent, as indicated. It also is apparent from this chart that the smallest tip height of 0.001 inches is achieved for the 0.040 line having a 90 percent mass of the main body portion 14 with the diameter $D_1$. Similarly, the maximum or largest tip height for the maximum diameter line 0.155 is shown on Table 1 as 0.0127 inches. This is less than the 0.015 inch tip height discussed above.

The foregoing description of the preferred embodiment of the invention should be considered as illustrative and not as limiting. Various changes will occur to those skilled in the art for performing substantially the same function, in substantially the same way, to achieve substantially the same result, without departing from the true scope of the invention as defined in the appended claims.

What is claimed is:

1. A line for a rotating string trimmer comprises an elongated flexible cutting element having a main body portion of circular cross section with a central axis and at least three spaced longitudinal outwardly-extending cutting edges on said main body portion, where the amount of extension of said cutting edges outwardly from said main body portion is selected to cause the cross-sectional area of said main body portion of said line to be between 70 percent and 90 percent of the area of a circular space circumscribing said cutting edges.

2. The line according to claim 1 wherein said flexible cutting element has a uniform cross section throughout its length.

3. The line according to claim 1 wherein said elongated flexible cutting element is made of extruded material.

4. The line according to claim 3 wherein said elongated cutting element is made of extruded plastic material.

5. The line according to claim 4 wherein said elongated flexible cutting element is made of monofilament nylon material.

6. The line according to claim 1 wherein the cross-sectional configuration of said outwardly extending cutting edges is triangular.

7. The line according to claim 1 wherein the cross-sectional configuration of said outwardly-extending cutting edges is a section of a circle.

8. The line according to claim 7 wherein said longitudinal outwardly-extending cutting edges are equally circumferentially spaced about said main body portion.

9. The line according to claim 8 wherein said longitudinal extending cutting edges extend outwardly from said main body portion a distance between 0.001 inches and 0.015 inches.

10. The line according to claim 9 wherein said main body portion is located inwardly from a straight line extending from one cutting edge to an adjacent cutting edge a distance which is less than 10 percent of the length of said straight line.

11. The line according to claim 10 wherein the line for said rotating string trimmer has between six and eight cutting edges.

12. The line according to claim 1 wherein said at least three cutting edges comprise at least five cutting edges and said main body portion is located inwardly from a straight line extending from one cutting edge to an adjacent cutting edge a distance which is less than 10 percent of the length of said straight line.

13. The line according to claim 1 wherein said line has between three and eight cutting edges.

14. The line according to claim 1 wherein said longitudinal extending cutting edges extend outwardly from said main body portion a distance between 0.001 inches and 0.015 inches.

15. The line according to claim 14 wherein said elongated cutting element is made of extruded plastic material.

16. The line according to claim 15 wherein said elongated flexible cutting element is made of monofilament nylon material.

17. A line for a rotating string trimmer comprises an elongated flexible cutting element having a main body portion of a substantially square cross section with a central axis and at least four spaced longitudinal outwardly-extending cutting edges on said main body portion, where the amount of extension of said cutting edges outwardly from said main body portion is selected to cause the cross-sectional area of said main body portion of said line to be between 70 percent and 90 percent of the area of a square space circumscribing said cutting edges.

* * * * *